(12) United States Patent
Lee et al.

(10) Patent No.: US 8,357,066 B2
(45) Date of Patent: Jan. 22, 2013

(54) DRIVE MECHANISM

(75) Inventors: Chun-Tang Lee, Suzhou (CN);
Xin-Chang Yang, Suzhou (CN);
Zhong-Cheng Li, Suzhou (CN)

(73) Assignee: Aixin Technologies, LLC, Wilmington, DE (US)

( * ) Notice: Subject to any disclaimer, the term of this patent is extended or adjusted under 35 U.S.C. 154(b) by 414 days.

(21) Appl. No.: 12/711,964

(22) Filed: Feb. 24, 2010

(65) Prior Publication Data

US 2010/0243394 A1  Sep. 30, 2010

(30) Foreign Application Priority Data

Mar. 30, 2009 (TW) .............................. 98110367 A

(51) Int. Cl.
*F16H 3/74* (2006.01)
(52) U.S. Cl. ..................................................... 475/261
(58) Field of Classification Search .................. 475/256, 475/258, 261; 160/296, 297, 300; 192/223.1, 192/104 B, 215; 188/180
See application file for complete search history.

(56) References Cited

U.S. PATENT DOCUMENTS

| | | | |
|---|---|---|---|
| 2,771,792 A * | 11/1956 | Whitney | 475/256 |
| 4,513,805 A | 4/1985 | Mase | |
| 5,099,906 A * | 3/1992 | Chigusa et al. | 160/297 |
| 5,494,093 A | 2/1996 | Eiterman | |
| 6,155,328 A | 12/2000 | Welfonder | |
| 7,706,067 B2 * | 4/2010 | Liang | 359/461 |
| 2009/0318258 A1 * | 12/2009 | Yang | 475/343 |

FOREIGN PATENT DOCUMENTS

| | | |
|---|---|---|
| CN | 2720483 | 8/2005 |
| EP | 0 093 289 | 11/1983 |
| EP | 0093289 A2 | 11/1983 |
| EP | 1 327 744 A1 | 7/2003 |
| EP | 1327744 A1 | 7/2003 |
| TW | M352061 | 8/2008 |

\* cited by examiner

*Primary Examiner* — Sherry Estremsky
(74) *Attorney, Agent, or Firm* — Christensen O'Connor Johnson Kindness PLLC

(57) ABSTRACT

A drive mechanism includes a housing, a stationary shaft, at least one acceleration gear assembly, a rotation plate, and at least two centrifugal blades. The acceleration gear assembly having a plurality of acceleration gears is disposed inside the housing and pivots on the stationary shaft, and skewed teeth of the housing engage with the acceleration gears to force the acceleration gears to rotate as the housing rotates. The rotation plate is disposed inside the housing and pivots on the stationary shaft, and is actuated by the acceleration gear assembly and has a first end surface, a second end surface, and a first annular surface connected with the first and the second end surfaces. The centrifugal blades are disposed on the second end surface, and one side of the centrifugal blades has a unidirectional rotatable element engaging with the skewed teeth when the rotation direction of the housing reverses.

13 Claims, 9 Drawing Sheets

DRIVE MECHANISM

CROSS-REFERENCE TO RELATED APPLICATION

This application claims the priority of Taiwan application serial No. 098110367, filed on Mar. 30, 2009. The entirety of the above-mentioned patent application is hereby incorporated by reference herein and made a part of this specification.

BACKGROUND

FIG. 1A and FIG. 1B are cross-sections illustrating a conventional drive mechanism 100 having the functions of auto-deceleration and self-locking. Referring to both FIG. 1A and FIG. 1B, a rotating housing 102 may force three inside acceleration gear assemblies 104a, 104b and 104c to rotate and thus enable a centrifugal brake shoe 106 to rotate at a high speed. When the centrifugal brake shoe 106 rotates in a rotation direction R at a high speed, the centrifugal brake shoe 106 also naturally moves outwards in a direction S to rub against the housing 102 to fulfill auto-deceleration. Further, when the housing 102 ceases rotating, the centrifugal brake shoe 106 also ceases rotating and returns to the center due to the gravity force. Hence, the gear tooth of a metal fixed gear 110 hangs on a hook 108 of the centrifugal brake shoe 106 to fulfill self-locking.

BRIEF SUMMARY

The present disclosure provides a drive mechanism having a simplified configuration to fulfill the functions of auto-deceleration and self-locking and a comparatively high number of times of self-locking per revolution.

According to an embodiment of the present disclosure, a drive mechanism includes a housing, a stationary shaft, at least one acceleration gear assembly, a rotation plate, and at least two centrifugal blades. The housing has a plurality of skewed teeth formed on an inner wall of the housing, and the stationary shaft is substantially positioned in the center of the housing. The acceleration gear assembly is disposed inside the housing and pivots on the stationary shaft. The acceleration gear assembly has a plurality of acceleration gears, and the skewed teeth engage with the acceleration gears to force the acceleration gears to rotate as the housing rotates. The rotation plate is disposed inside the housing and pivots on the stationary shaft, and the rotation plate is actuated by the acceleration gear assembly and has a first end surface facing the acceleration gear assembly, a second end surface opposite the first end surface, and a first annular surface connected with the first end surface and the second end surface. The centrifugal blades are disposed on the second end surface of the rotation plate, and one side of each of the centrifugal blades has a unidirectional rotatable element. The unidirectional rotatable element engages with the skewed teeth when the rotation direction of the housing reverses.

In one embodiment, the drive mechanism further includes an elastic member surrounding the rotation plate and covering the first annular surface, and the rotation plate further includes at least one notch and a ball. The notch is indented on the first annular surface and towards the inside of the rotation plate, and the ball is accommodated in the notch, and allowed to rub against the elastic member.

In one embodiment, each of the centrifugal blades further includes a curved portion connected with the unidirectional rotatable element and resting on the stationary shaft.

In one embodiment, the drive mechanism further includes a positioning module having a plurality of fixed pillars on the second end surface of the rotation plate and a plurality of retaining holes on the centrifugal blades. The fixed pillars are inserted into respective retaining holes to fix the centrifugal blades on the second end surface of the rotation plate.

In one embodiment, the drive mechanism further includes an elastic member surrounding the centrifugal blades, and each of the centrifugal blades further includes a second annular surface facing an inner wall of the elastic member and being covered by the elastic member, at least one notch indented on the second annular surface and towards the inside of the centrifugal blade, and at least one ball accommodated in the notch and allowed to rub against the elastic member.

In one embodiment, an extending direction of the notch towards the inside of the centrifugal blade makes an angle with a radial direction of the rotation plate.

According to the above embodiments, the projection screen is allowed to stay at any selected position when pulled down and permits smooth scrolling when retracted. Hence, abnormal shocks to the projection screen may be eliminated when the projection screen is retracted at a high speed. Further, compared with the conventional design, the above embodiments provide a far greater number of times of self-locking to obtain fine adjustment for positioning and a simplified configuration to reduce fabrication costs.

Other objectives, features and advantages of the present disclosure will be further understood from the further technological features disclosed by the embodiments of the present disclosure wherein there are shown and described preferred embodiments of this present disclosure, simply by way of illustration of modes best suited to carry out the present disclosure.

DETAILED DESCRIPTION OF THE INVENTION

In the following detailed description of the preferred embodiments, reference is made to the accompanying drawings which form a part hereof, and in which are shown by way of illustrating specific embodiments in which the claimed subject matter may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for the purpose of illustration and is in no way limiting. On the other hand, the drawings are only schematic and the sizes of components may be exaggerated for clarity. It is to be understood that other embodiments may be utilized and structural changes may be made without departing from the scope of the present disclosure.

Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
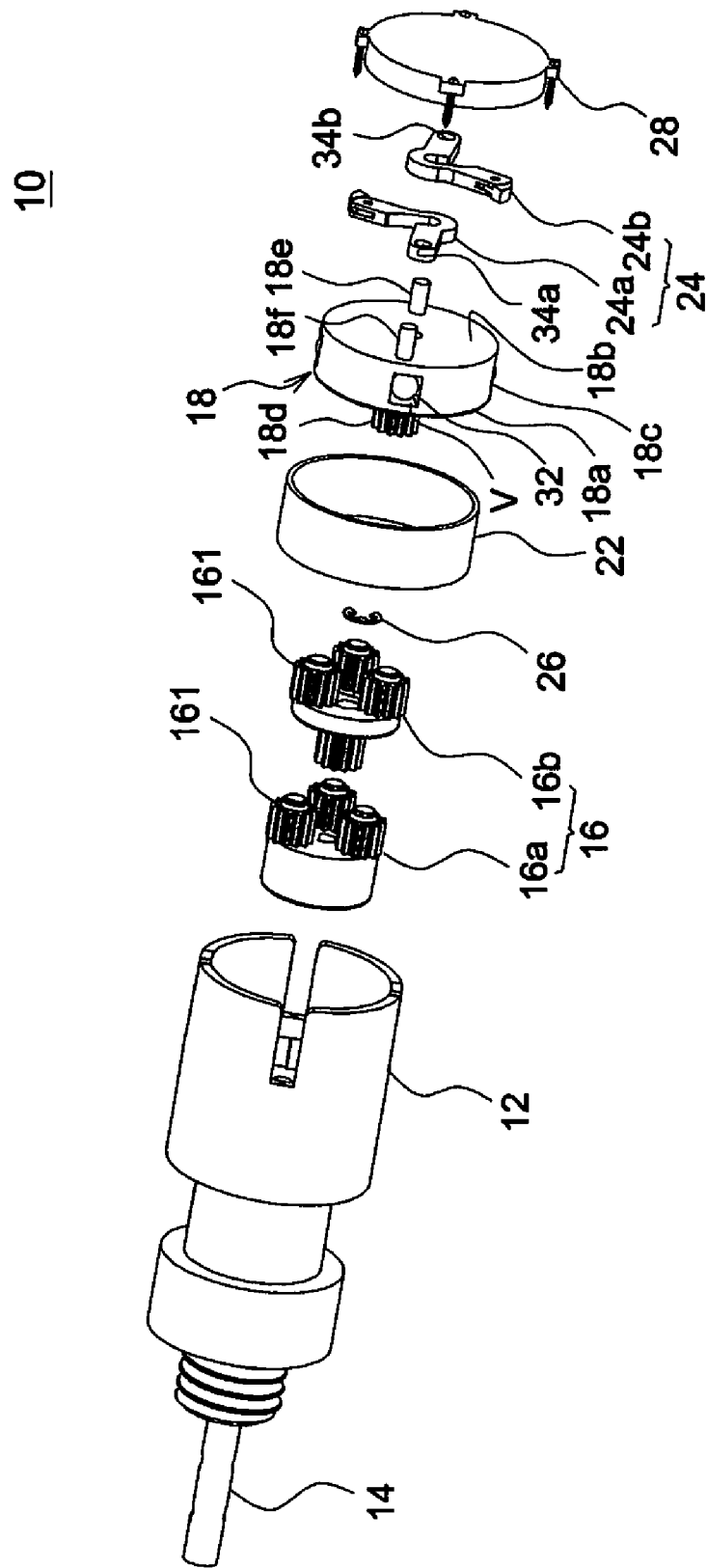
FIG. 2 shows an exploded view of a drive mechanism having the functions of auto-deceleration and self-locking according to an embodiment of the present disclosure.
Figure 3:
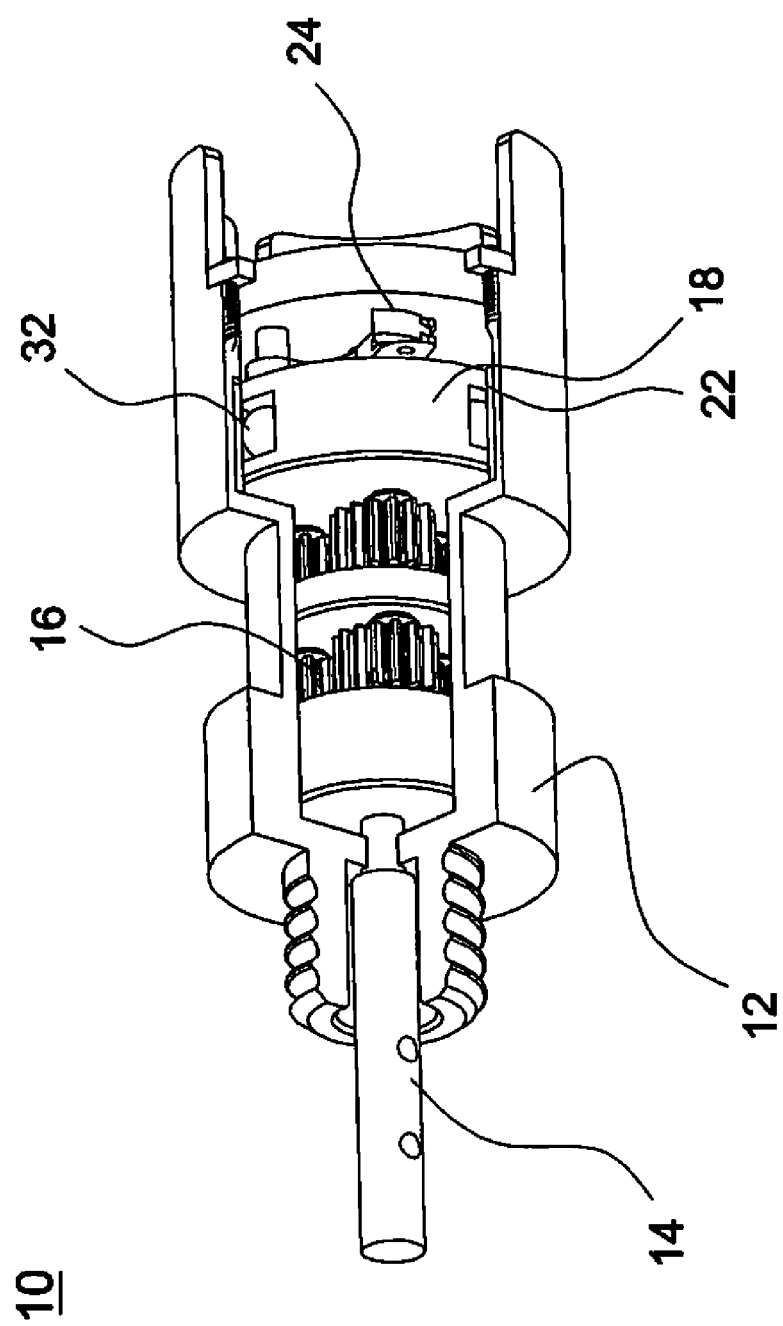
FIG. 3 shows an enlarged view of an assembled drive mechanism according to FIG. 2.
Figure 4:
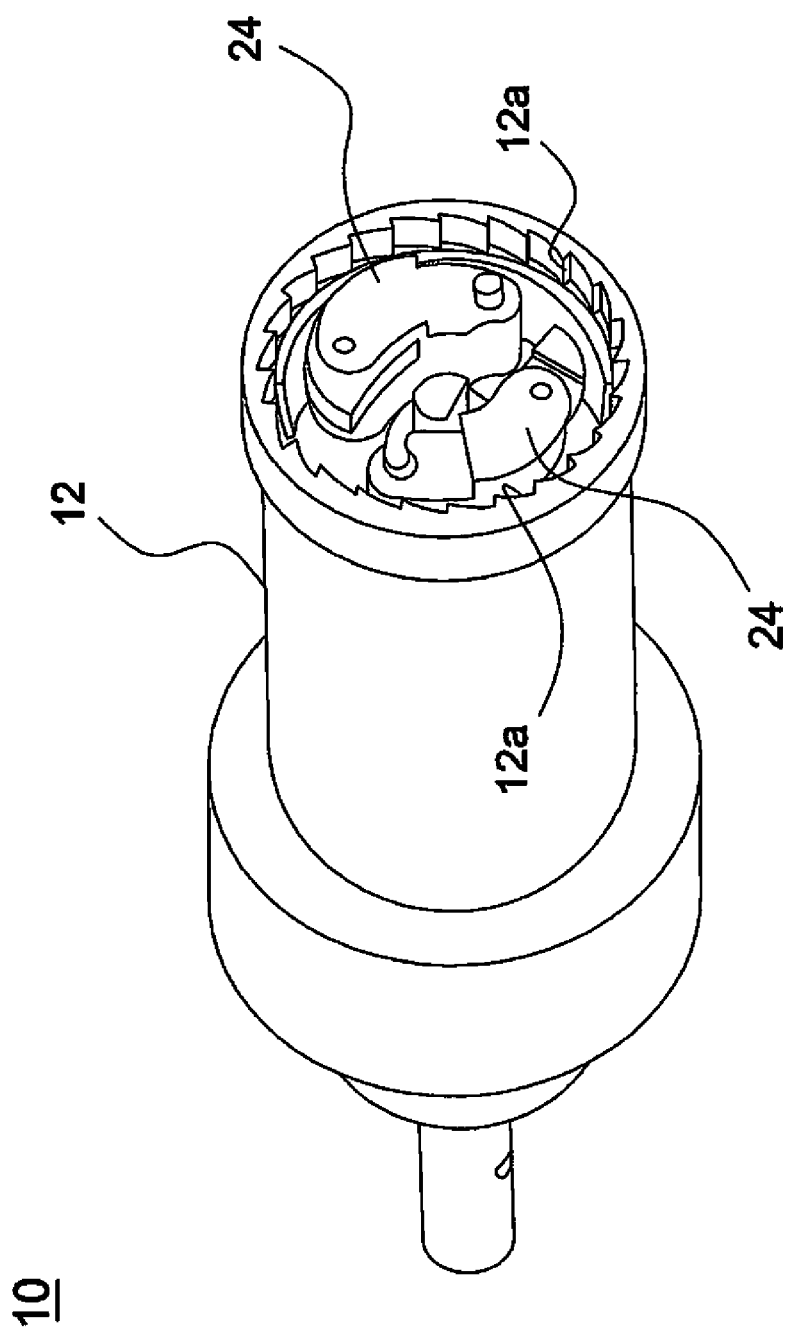
FIG. 4 shows a schematic diagram illustrating the drive mechanism of FIG. 2 viewed from another direction.

Referring to FIG. 2 and FIG. 3, the drive mechanism 10 may be, for example, used in a projection screen. When the projection screen is manually pulled down or is retracted, the function of auto-deceleration permits smooth scrolling and the function of self-locking allows the projection screen to stay at any selected position. In the embodiment, the drive mechanism 10 includes a housing 12, a stationary shaft 14, at least one acceleration gear assembly 16 (exemplified in FIG. 2 as two acceleration gear assemblies 16a and 16b), a rotation plate 18, an annular elastic member 22, a pair of centrifugal blades 24 (including centrifugal blades 24a and 24b), a circlip 26 (or a C-ring), and a cover 28. The stationary shaft 14 is substantially positioned in the center of the housing and keeps fixed as the housing 12 rotates. The acceleration gear assembly 16 and the rotation plate 18 are disposed inside the housing 12 and pivot on the stationary shaft 14, and each of the acceleration gear assemblies 16 includes a plurality of acceleration gears. The rotation plate 18 has a first end surface 18a facing the acceleration gear assembly 16, a second end surface 18b opposite the first end surface 18a, and an annular surface 18c connected with the first end surface 18a and the second end surface 18b. A mesh gear 18d is formed on the first end surface 18a to engage with the acceleration gear assembly 16. In addition, as shown in FIG. 4, the drive mechanism 10 is viewed from another direction, and a plurality of skewed teeth 12a are formed on an inner wall of the housing 12. Since the acceleration gears 161 (shown in FIG. 2) of the acceleration gear assembly 16 engage with the skewed teeth 12a, the housing 12 when rotating forces the acceleration gears 161 to rotate, and the rotating acceleration gears 161 further force the rotation plate 18 to rotate. In this embodiment, the rotation plate 18 has a plurality of notches V indented on the annular surface 18c and towards the inside of the rotation plate 18, and an extending direction of each of the notches V is parallel to a radial direction of the rotation plate 18. Each of the notches V accommodates a ball 32, and the annular elastic member 22 surrounds the rotation plate 18 and covers the annular surface 18c. Hence, when the rotation plate 18 rotates at a high speed, the balls 32 are thrown outwards by the centrifugal force to rub against an inner wall of the annular elastic member 22 so as to fulfill the function of auto-deceleration. The annular elastic member 22 may be a rubber ring.

In the embodiment, the drive mechanism 10 may further include a positioning module to fix the centrifugal blades 24 on the second end surface 18b of the rotation plate 18. Specifically, two fixed pillars 18e and 18f are formed on the second end surface 18b of the rotation plate 18, and the centrifugal blades 24a and 24b have respective retaining holes 34a and 34b positioned in symmetry and corresponding to the fixed pillars 18e and 18f. When the fixed pillars 18e and 18f are respectively inserted into the retaining holes 34a and 34b, the centrifugal blades 24a and 24b are symmetrically mounted on the second end surface 18b of the rotation plate 18 in relation to the stationary shaft 14. The cover 28 is disposed on one side of the centrifugal blades 24a and 24b opposite the second end surface 18b, and the cover 28 is secured to the housing 12 to protect the components inside the housing 12.

Figure 5:
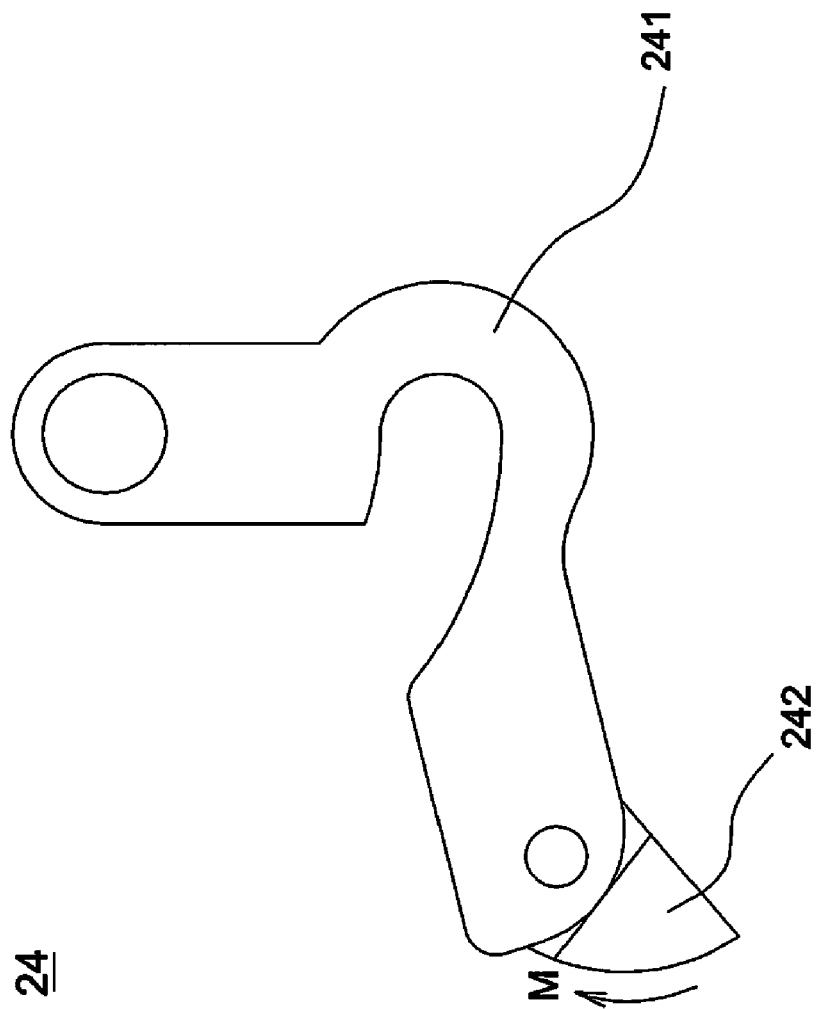
FIG. 5 shows a schematic diagram of centrifugal blades according to an embodiment of the present disclosure.

The function of self-locking of the drive mechanism 10 according to an embodiment of the present disclosure is described below in detail. Referring to FIG. 4, the skewed teeth 12a formed on an inner wall of the housing 12 may cooperate with the centrifugal blades 24 to fulfill the function of self-locking. As shown in FIG. 5, each of the centrifugal blades 24 has a curved portion 241 and a unidirectional rotatable element 242 (rotating in direction M, either clockwise or counterclockwise). The unidirectional rotatable element 242 positioned on one side of each centrifugal blade 24 is allowed to engage with the skewed teeth 12 at the moment when the rotating direction of the housing 12 reverses so as to fulfill self-locking. The curved portion 241 of each of the centrifugal blades 24 slidably rests on the stationary shaft 14. Further, in the embodiment, when the projection screen is pulled down or retracted at a high speed, the unidirectional rotatable elements 242 of the centrifugal blades 24 are centrifugally thrown off.

Figure 1A:
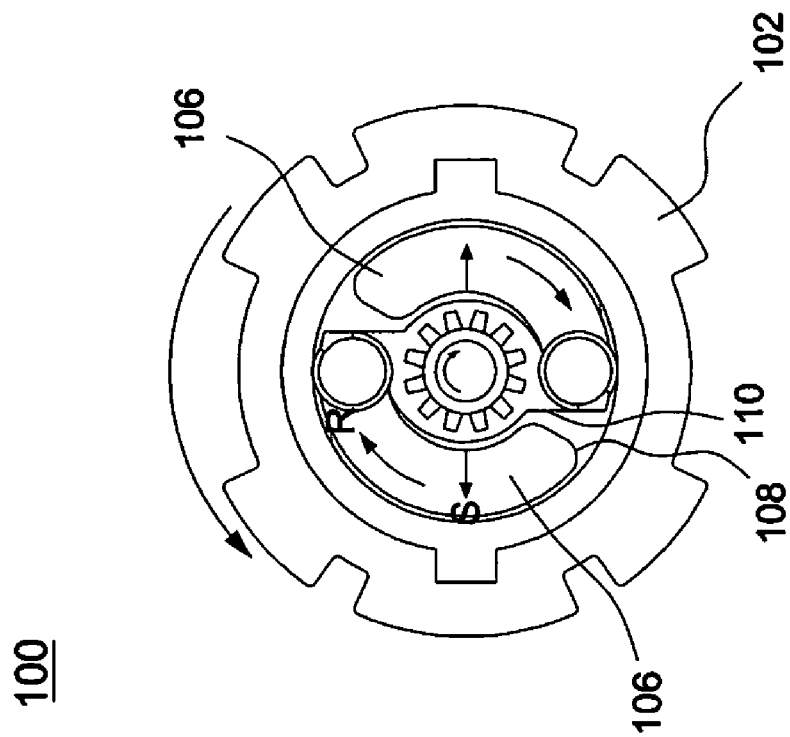
FIG. 1A and FIG. 1B are cross-sections illustrating a conventional drive mechanism having the functions of auto-deceleration and self-locking.
Figure 1B:
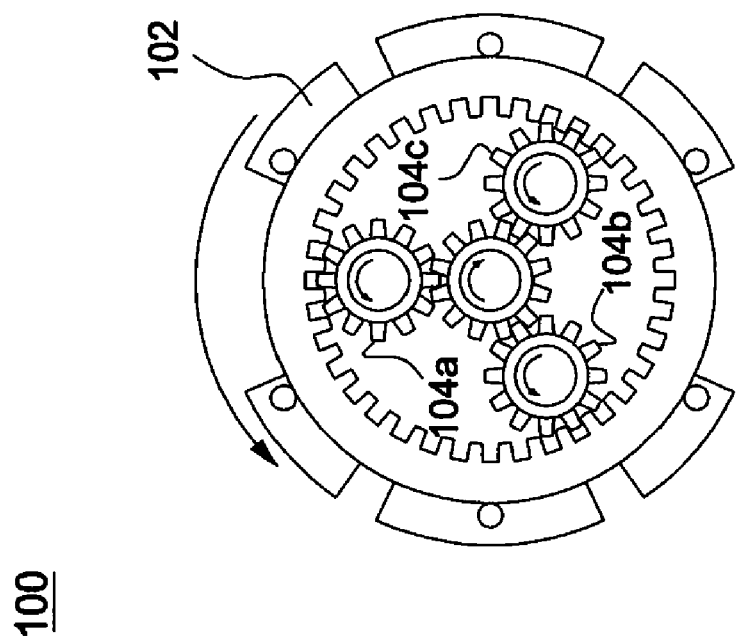
Figure 6:
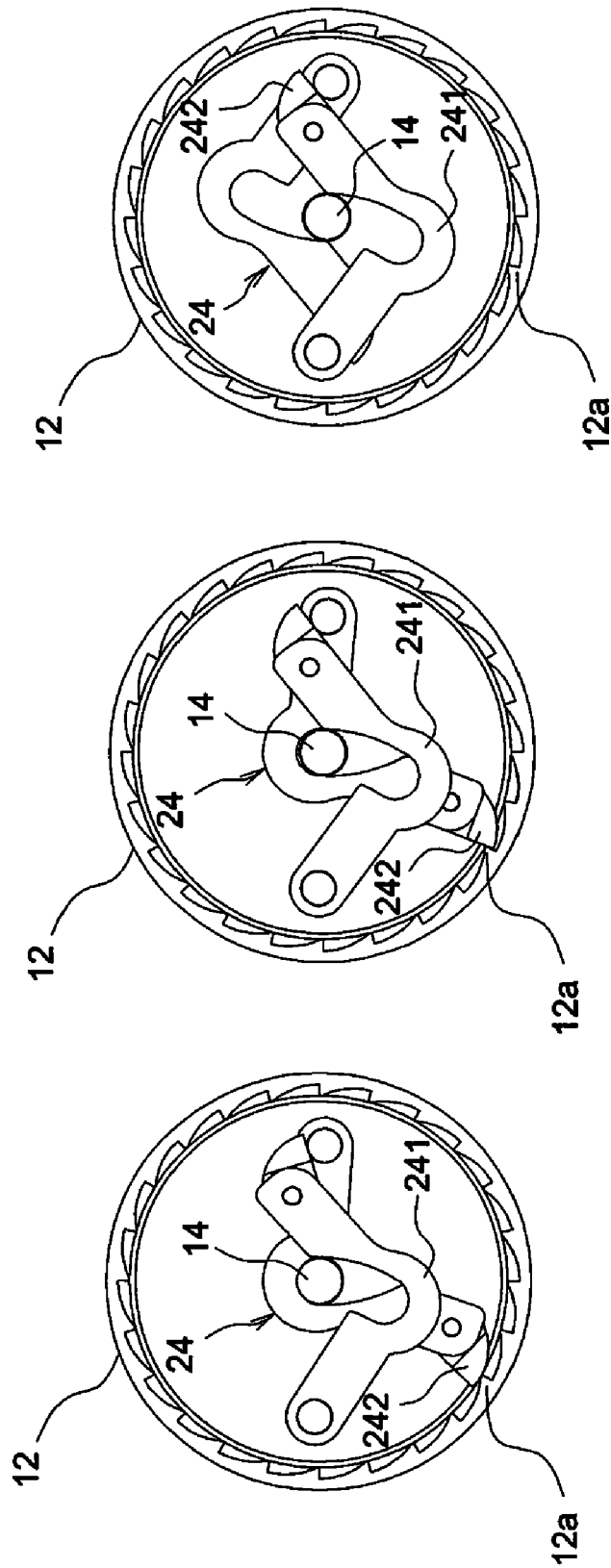
FIGS. 6A-6C show schematic diagrams illustrating the self-locking operation according to an embodiment of the present disclosure.

The self-locking operation is described below with reference to FIGS. 6A-6C. As shown in FIG. 6A, when the drive mechanism 10 ceases rotating, the curved portion 241 of the centrifugal blade 24 rests on the stationary shaft 14 due to the gravity force and the unidirectional rotatable element 242 slides into the skewed teeth 12a on an inner wall of the housing 12. In case the projection screen is retracted at this time, the rotating direction of the housing 12 reverses and thus the unidirectional rotatable element 242 of the centrifugal blade 24 engages with the skewed teeth 12a to fulfill self-locking, as shown in FIG. 6B. According to the embodiment, 24 times of self-locking per revolution are fulfilled as the housing 12 rotates, and such number of times is far higher than the number achieved by the conventional drive mechanism shown in FIGS. 1A and 1B. Then, as shown in FIG. 6C, when the projection screen turns to be pulled down, the centrifugal blades 24 are again centrifugally thrown off, and thus the curved portion 241 of the centrifugal blade 24 leaves the stationary shaft 14 to remove self-locking.

Figure 7:
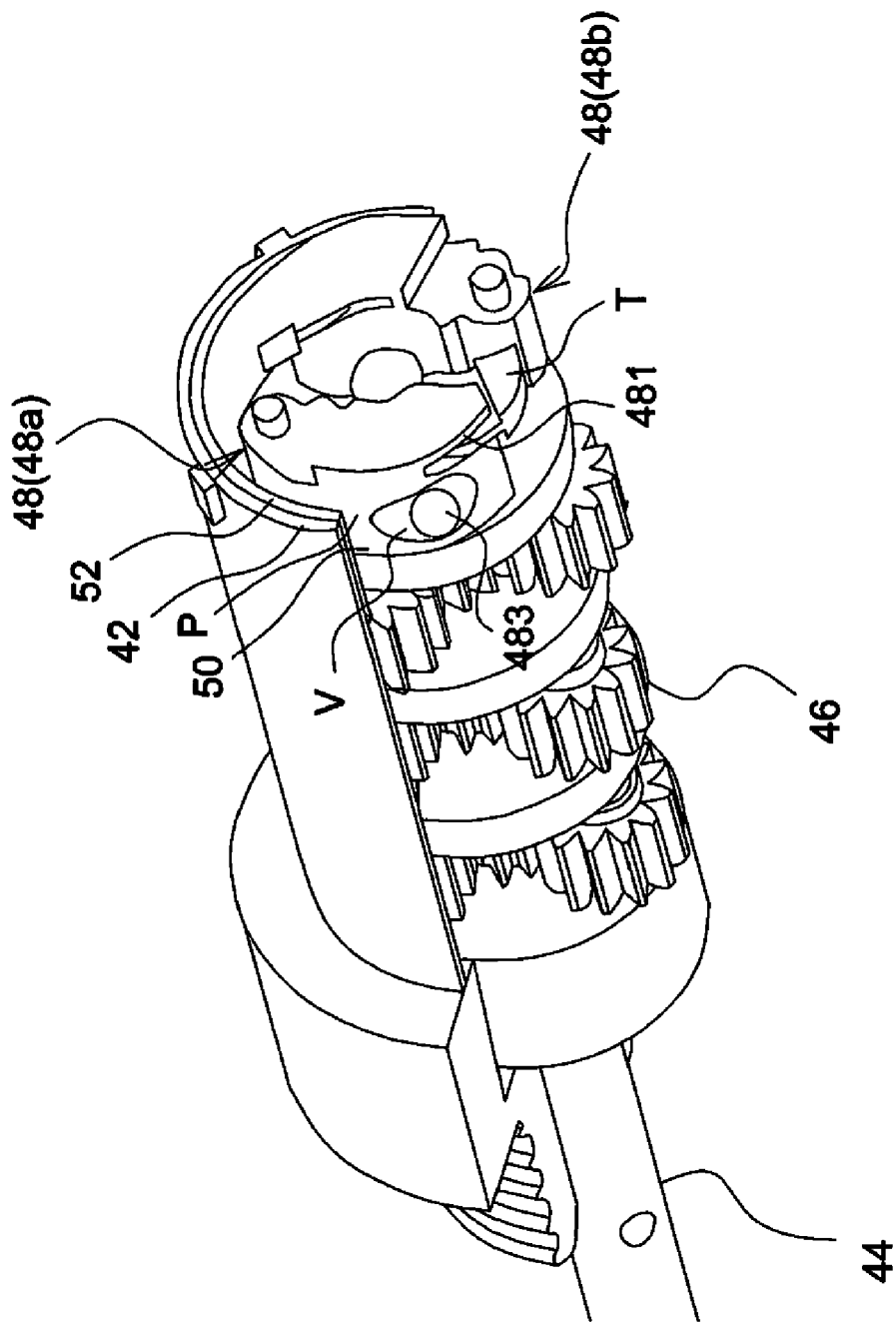
FIG. 7 shows an exploded view of a drive mechanism having the functions of auto-deceleration and self-locking according to another embodiment of the present disclosure.
Figure 8A:
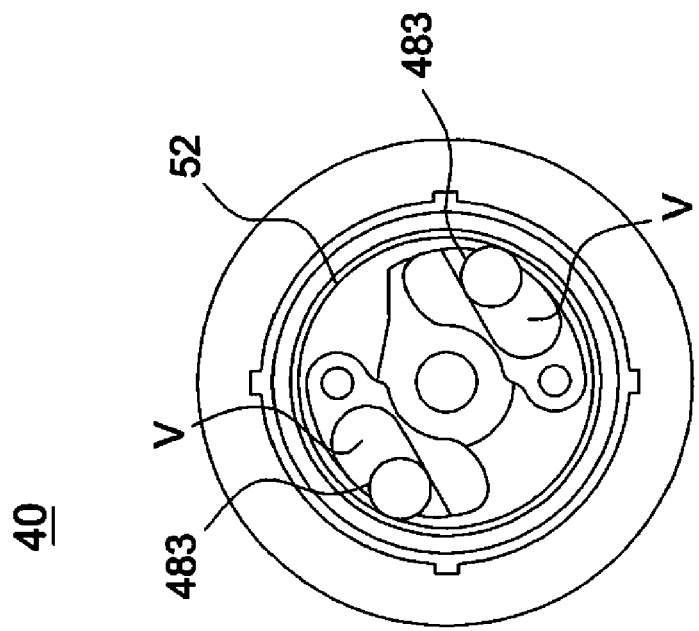
FIG. 8A and FIG. 8B show schematic diagrams illustrating the auto-deceleration operation according to an embodiment of the present disclosure.
Figure 8B:
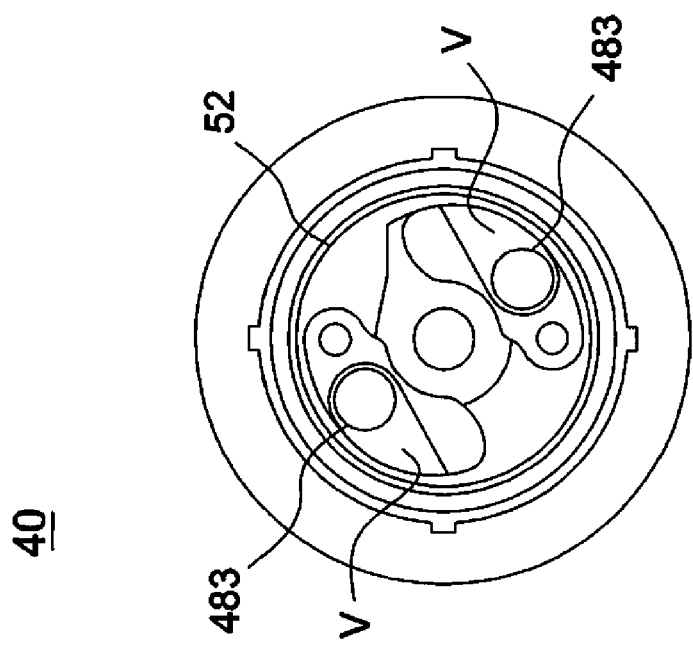
Figure 9A:
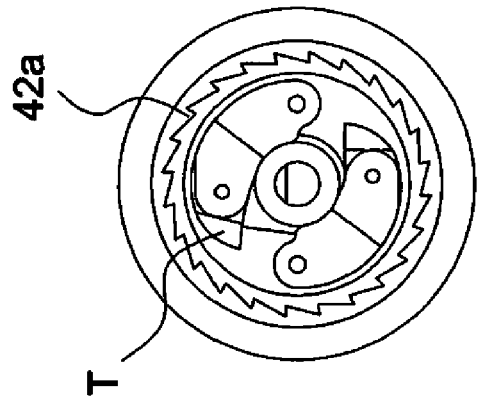
FIGS. 9A-9C show schematic diagrams illustrating the self-locking operation according to another embodiment of the present disclosure.
Figure 9B:
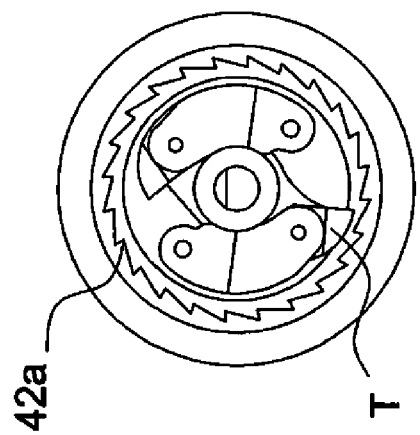
Figure 9C:
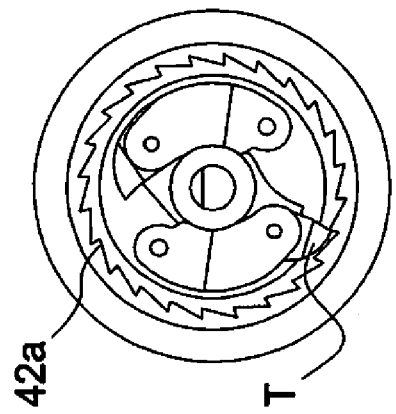

Referring to FIG. 7, the drive mechanism 40 has a housing 42, a stationary shaft 44, a plurality of acceleration gear assemblies 46 (exemplified as three acceleration gear assemblies), a rotation plate 50, a pair of centrifugal blades 48 (including centrifugal blades 48a and 48b), and an annular elastic member 52. The stationary shaft 44 is substantially positioned in the center of the housing 42 and keeps fixed as the housing 42 rotates. The acceleration gear assembly 46 and the rotation plate 50 are disposed inside the housing 42 and pivot on the stationary shaft 44 to actuate the centrifugal blades 48. Though not illustrated in FIG. 7, the drive mechanism 40 according to the embodiment may further include a cover secured to the housing 42 to protect the components inside the housing 42. In the embodiment, the rotation plate 50 and the centrifugal blades 48 are similar to the rotation plate 18 and the centrifugal blades 24 shown in FIG. 2 except for certain minor differences. In the embodiment, each of the centrifugal blades 48 has an annular surface P facing an inner wall of the annular elastic member 52, at least one notch V indented on the annular surface P and towards the inside of the centrifugal blade 48, and at least one ball 483 accommodated in the notch V. The centrifugal blade 48 also has a curved portion 481 and a unidirectional rotatable element T. The unidirectional rotatable element T positioned on one side of the centrifugal blade 48 is allowed to engage with the skewed teeth 42a at the moment when the rotating direction of the housing 42 reverses so as to fulfill self-locking. The curved portion 481 slidably rests on the stationary shaft 44. The annular elastic member 52 surrounds the rotation plate 48 and covers the annular surface P. Hence, when the rotation plate 50 rotates at a high speed, the balls 483 are thrown outward by the centrifugal force to rub against an inner wall of the annular elastic member 52 so as to fulfill the function of auto-deceleration. Also, the annular elastic member 52 may be a rubber ring. Please refer to both FIGS. 8A and 8B. In this embodiment, when the projection screen is continually pulled down (FIG. 8A), the centrifugal blade 48 rotates at a high speed to force the ball 483 to run into the bottom of a notch V, and thus the ball 483 does not rub against the rubber ring 52 to trigger auto-deceleration. In comparison, when the projection screen is continually retracted (FIG. 8B), the rotation plate 48 rotates at a high speed to throw the ball 483 out of the bottom of the notch V, and thus the ball 483 rubs against the rubber ring 52 to fulfill the function of auto-deceleration. Further, in the embodiment, an extending direction of the notch V extends towards the inside of the centrifugal blade 48 and makes an angle with a radial direction of the rotation plate 50 to achieve smoother rolling of the ball 483 inside the notch V. Next, the self-locking operation is described below with reference to FIGS. 9A-9C. As shown in FIG. 9A, when the projection screen is pulled down or retracted, to cause the drive mechanism 40 to rotate at a high speed, the unidirectional rotatable element T is centrifugally thrown off. Then, the unidirectional rotatable element T falls down due to the gravity force when the drive mechanism 40 ceases rotating, as shown in FIG. 9B. Subsequently, when the projection screen is again retracted, the unidirectional rotatable element T engages with the skewed teeth 42a to fulfill self-locking, as shown in FIG. 9C.

In summary, the above embodiment or embodiments may have, among others, at least one of the following advantages, by means of the drive mechanisms 10 and 40, the projection screen is allowed to stay at any selected position when pulled down and permits smooth scrolling when retracted. Hence, abnormal shocks to the projection screen may be eliminated when the projection screen is retracted at a high speed. Further, compared with the conventional design, the above embodiments provide for a far greater number of times of self-locking, to obtain fine adjustment for positioning and a simplified configuration to reduce fabrication costs. Though the above embodiments use a rubber ring to provide smooth deceleration, this is not limited. Other annular elastic members may also be used, as long as the annular elastic member is allowed to be coupled to a rotation plate to provide smooth deceleration.

The foregoing description of the preferred embodiments of the present disclosure has been presented for purposes of illustration and description. It is not intended to be exhaustive or to limit the present disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the present disclosure and its best mode of practical application, thereby to enable persons skilled in the art to understand the present disclosure and its various embodiments and including various modifications as may be suited to the particular use or implementation contemplated. It is intended that the scope of the present disclosure be defined by the claims appended hereto and their equivalents, in which all terms are meant in their broadest reasonable sense unless otherwise indicated. Therefore, any reference to particularly preferred exemplary embodiments of the present disclosure does not imply a limitation on the present disclosure, and no such limitation is to be inferred. Embodiments discussed herein are limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the present disclosure. It should be appreciated that variations may be made in the described embodiments by persons skilled in the art without departing from the scope of the claimed subject matter. Moreover, no element or component in the present disclosure is intended to be dedicated to the public regardless of whether the element or component is explicitly recited in the following claims.

What is claimed is:

1. A drive mechanism, comprising:
   a housing having a plurality of force transmission members formed on an inner wall of the housing;
   a stationary shaft substantially positioned in the center of the housing;
   at least one acceleration gear assembly disposed inside the housing and configured to pivot on the stationary shaft, the at least one acceleration gear assembly having a plurality of acceleration gears configured to engage the plurality of force transmission members to force the acceleration gears to rotate as the housing rotates;
   a rotation plate disposed inside the housing and configured to pivot on the stationary shaft, wherein the rotation plate is actuated by the acceleration gear assembly and has a first end surface facing the acceleration gear assembly, a second end surface opposite the first end surface, and a first annular surface connected with the first end surface and the second end surface; and
   at least two centrifugal blades disposed on the second end surface of the rotation plate, wherein one side of each of the centrifugal blades has a unidirectional rotatable element configured to engage with the plurality of force transmission members when the rotation direction of the housing reverses.

2. The drive mechanism as claimed in claim 1, further comprising an elastic member disposed in surrounding relationship with the rotation plate and configured to cover the first annular surface, and wherein the rotation plate further comprises:

at least one notch indented on the first annular surface and positioned towards the inside of the rotation plate; and a ball accommodated in the notch and allowed to frictionally engage against the elastic member.

3. The drive mechanism as claimed in claim 2, wherein an extending direction of the notch towards the inside of the rotation plate is parallel to a radial direction of the rotation plate.

4. The drive mechanism as claimed in claim 2, wherein the elastic member comprises a rubber ring.

5. The drive mechanism as claimed in claim 1, wherein each of the centrifugal blades further comprises a curved portion connected with the unidirectional rotatable element and configured to rest on the stationary shaft.

6. The drive mechanism as claimed in claim 1, wherein the centrifugal blades are symmetrically mounted on the second end surface of the rotation plate in relation to the stationary shaft.

7. The drive mechanism as claimed in claim 1, further comprising a positioning module having a plurality of fixed pillars on the second end surface of the rotation plate and a plurality of retaining holes on the centrifugal blades, and the fixed pillars being inserted into respective retaining holes to fix the centrifugal blades on the second end surface of the rotation plate.

8. The drive mechanism as claimed in claim 1, wherein the rotation plate further comprises a mesh gear formed on the first end surface and configured to engage with the acceleration gear assembly.

9. The drive mechanism as claimed in claim 1, further comprising a cover disposed on one side of the centrifugal blade opposite the second end surface and secured to the housing.

10. The drive mechanism as claimed in claim 1, further comprising an elastic member surrounding the centrifugal blades, and wherein each of the centrifugal blades further comprises:

a second annular surface facing an inner wall of the elastic member and covered by the elastic member;

at least one notch indented on the second annular surface and towards the inside of the centrifugal blade; and at least one ball accommodated in the notch and allowed to frictionally engage against the elastic member.

11. The drive mechanism as claimed in claim 10, wherein an extending direction of the notch towards the inside of the centrifugal blade forms an angle with a radial direction of the rotation plate.

12. The drive mechanism as claimed in claim 10, wherein the elastic member comprises a rubber ring.

13. The drive mechanism as claimed in claim 1, wherein the plurality of force transmission members include skewed teeth.

\* \* \* \* \*

UNITED STATES PATENT AND TRADEMARK OFFICE
CERTIFICATE OF CORRECTION

PATENT NO. : 8,357,066 B2  
APPLICATION NO. : 12/711964  
DATED : January 22, 2013  
INVENTOR(S) : Lee et al.

Page 1 of 1

It is certified that error appears in the above-identified patent and that said Letters Patent is hereby corrected as shown below:

On the Title Page

Item (56), under "FOREIGN PATENT DOCUMENTS", in Column 2, Line 2, delete "EP 0 093 289 11/1983".

Item (56), under "FOREIGN PATENT DOCUMENTS", in Column 2, Line 5, delete "EP 1327744 A1 7/2003".

In the Specification

In Column 4, Line 36, delete "teeth 12" and insert -- teeth 12a --, therefor.

In Column 5, Line 25, delete "plate 48" and insert -- plate 50 --, therefor.

In Column 5, Line 37, delete "plate 48" and insert -- plate 50 --, therefor.

Signed and Sealed this
Eleventh Day of March, 2014

Michelle K. Lee
*Deputy Director of the United States Patent and Trademark Office*